United States Patent
Beck et al.

(10) Patent No.: US 6,560,107 B1
(45) Date of Patent: May 6, 2003

(54) COOLING DEVICE FOR COMPUTER HARD DRIVE

(75) Inventors: Paul J. Beck, 131 Tyson Mill Rd., Collegeville, PA (US) 19426; Maxwell J. Beck, 1407 Edmundshire La., Orlando, FL (US) 32806

(73) Assignees: Paul J. Beck, Collegeville, PA (US); Maxwell J. Beck, Orlando, FL (US)

( * ) Notice: Subject to any disclaimer, the term of this patent is extended or adjusted under 35 U.S.C. 154(b) by 0 days.

(21) Appl. No.: 10/189,852

(22) Filed: Jul. 8, 2002

(51) Int. Cl.[7] .................................................. H05K 7/20
(52) U.S. Cl. ........................ 361/699; 361/685; 361/689; 174/15.1; 165/80.3; 165/104.33; 211/41.17
(58) Field of Search ........................ 361/685, 687–690, 361/698, 699, 704, 721, 715, 716, 790; 174/15.1, 16.1, 16.3, 252; 165/80.4, 104.33; 211/41.17

(56) References Cited

U.S. PATENT DOCUMENTS

| | | | | |
|---|---|---|---|---|
| 5,509,468 A | * | 4/1996 | Lopez | 165/144 |
| 5,943,219 A | * | 8/1999 | Bellino et al. | 361/816 |
| 6,072,697 A | * | 6/2000 | Garcia-Ortiz | 361/704 |
| 6,084,771 A | * | 7/2000 | Ranchy et al. | 361/699 |
| 6,115,251 A | * | 9/2000 | Patel et al. | 361/699 |
| 6,144,553 A | * | 11/2000 | Hileman et al. | 361/687 |
| 6,229,704 B1 | * | 5/2001 | Hoss et al. | 361/704 |
| 6,392,884 B1 | * | 5/2002 | Chou | 361/687 |
| 6,421,240 B1 | * | 7/2002 | Patel | 361/699 |

* cited by examiner

Primary Examiner—Boris Chervinsky

(57) ABSTRACT

Cooling Device for Computer Hard Drive with a rectangular cooling tank, a coolant entrance pipe, a coolant exit pipe, one wall of the tank being constructed of highly heat conductive metal such as solid silver, a plurality of cooling highly heat conductive plates, the plates each having a ninety degree flange, each the flange attached to the highly conductive tank plate wall, a plurality of hard drives sandwiched between each cooling plate, a plurality of compression screws that cause the cooling plates to remain in intimate contact with said hard drive housing, and a plurality of rubber shock mounts, the top of which communicates with said compression screw, the bottom of which communicates with a mounting rail. A preferred embodiment includes wherein said highly conductive cooling plates are made of silver and have an oxidized surface that allows infrared rays to be absorbed by said plate.

5 Claims, 2 Drawing Sheets

COOLING DEVICE FOR COMPUTER HARD DRIVE

BACKGROUND OF THE INVENTION

This invention relates generally to the field of cooling devices, and more particularly to a cooling device for a computer hard drive.

Hard drives are an essential part of most computers. They store valuable information that the user has put into the computer.

Hard drives need to be kept cool in order to operate properly and for long periods of time.

Most hard drives are cooled by fans. Fans are problematic in that they may not cool the hard drive evenly and not cool to as low a temperature as is ideal. Additionally, fans make noise. When multiple hard drives are being cooled, the noise can be objectionable. Also, fans and proper airflow around hard drives take up considerable room within the computer, making them larger and harder to move. Other methods of cooling have been explored including cooling coils that are made to be in close proximity to the hard drive. This method can be problematic in that the coils can become clogged and the interface between the coils and the hard drive may not be ideal. Additionally, the coils take up valuable space and are expensive to manufacture and install.

SUMMARY OF THE INVENTION

The primary object of the invention is to provide a cooling device for a computer hard drive that is compact.

Another object of the invention is to provide a cooling device that is quiet.

Another object of the invention is to provide a cooling device that is not prone to clogging or breakdown.

A further object of the invention is to provide a cooling device that is easy to install.

Yet another object of the invention is to provide a cooling device that will increase the life of a hard drive.

Other objects and advantages of the present invention will become apparent from the following descriptions, taken in connection with the accompanying drawings, wherein, by way of illustration and example, an embodiment of the present invention is disclosed.

Cooling Device for Computer Hard Drive comprising: a rectangular cooling tank, a coolant entrance pipe, a coolant exit pipe, one wall of said tank being constructed of highly conductive metal such as solid silver, a plurality of cooling plates, said plates each having a ninety degree flange, each said flange attached to said—highly conductive metal tank plate wall, a plurality of hard drives sandwiched between each said cooling plate, a plurality of compression screws that cause said cooling plates to remain in intimate contact with said hard drive housing, and a plurality of rubber shock mounts, the top of which communicates with said compression screw, the bottom of which communicates with a mounting rail.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
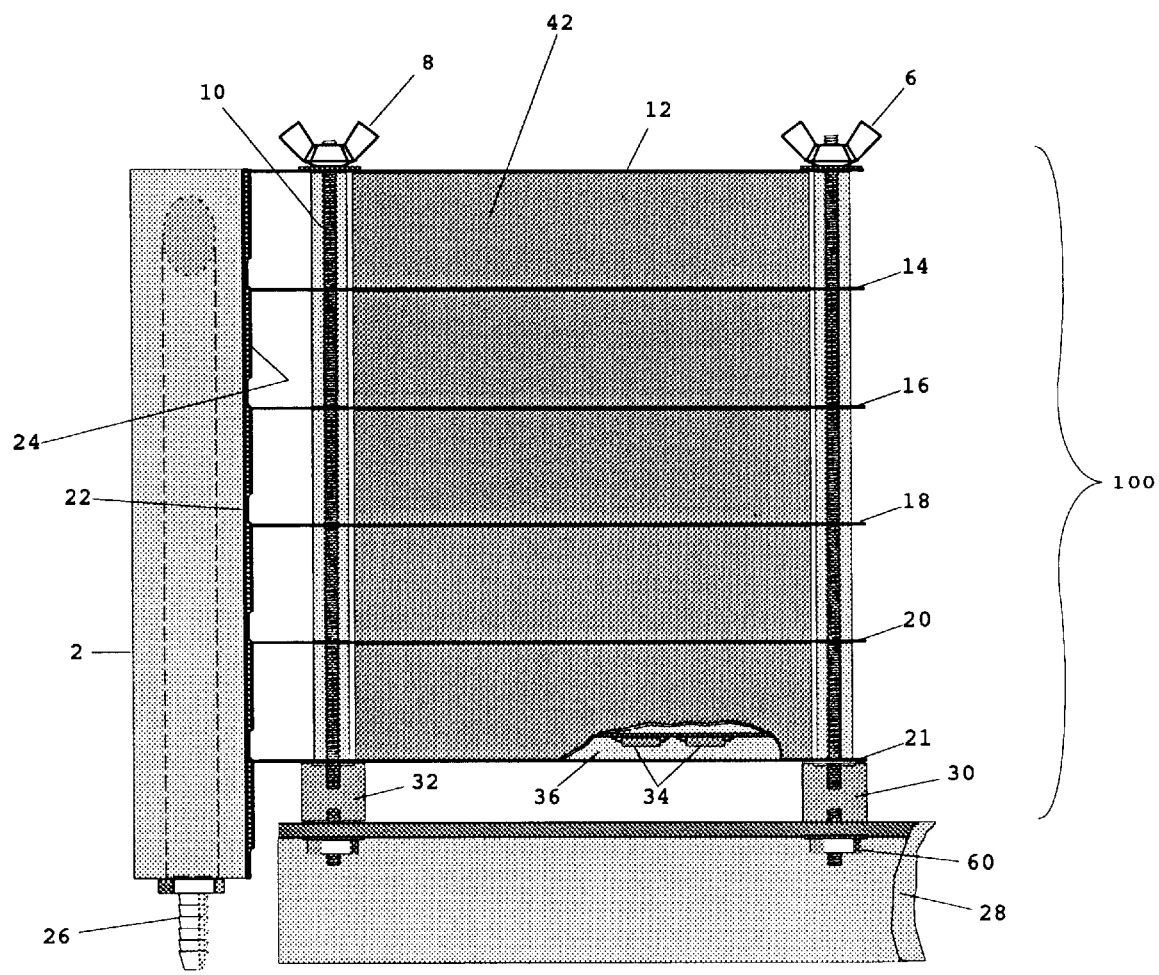
FIG. 1 is a side view of the hard drive cooling system of the present invention
Figure 2:
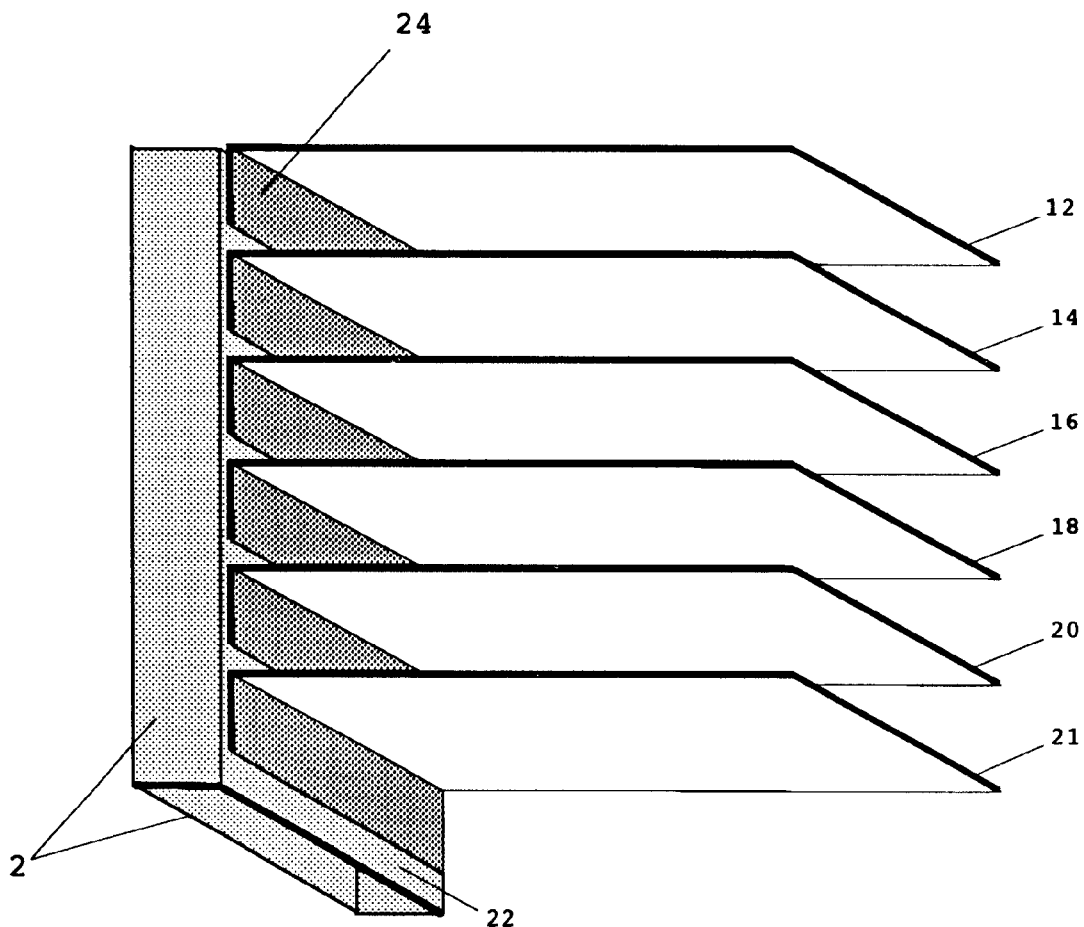
FIG. 2 is a perspective view of the hard drive cooling system of the present invention
Figure 2:
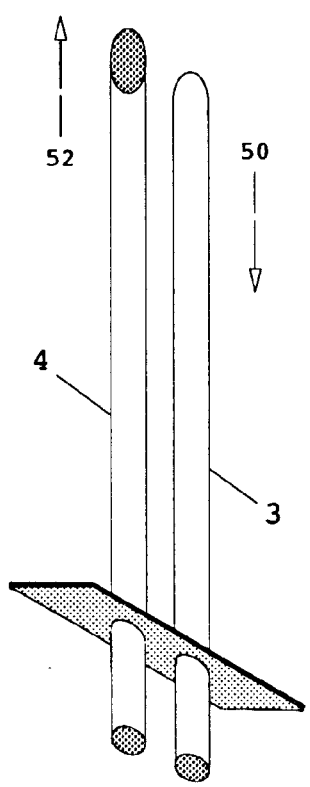

Referring now to FIG. 1 we see a side view of the cooling device of the present invention 100. A coolant reservoir 2 is formed by a drawn brass sheet to make an open sided rectangular box. The open side is covered by highly conductive metal panel 22. My experiments have shown that a highly pure form of silver makes an excellent heat conductor. Panel 22 is brazed or soldered to box portion 2. An intake fitting 26 admits a coolant into box 2. In conducting my experiments with the present invention, I have used a coolant consisting of seventy five percent distilled water and twenty five percent alcohol. The coolant is made cold by a standard cooling device such as a compressor. Ideal coolant temperature is approximately forty-five degrees Fahrenheit. The cool temperature is transferred to plate 22 and in turn transmitted to the flanges 24, listed only once but located on each highly conductive plate 12, 14, 16, 18, 20, 21. Flanges 24 are soldered to plate 22 by means of high temperature solder. In the preferred embodiment, the silver used in plates 22, 12, 14, 16, 18, 20, 21 are preferably made of ninety-nine and nine tenths percent pure silver and offer excellent cooling transfer properties. Although the silver plates are somewhat costly, the cost is justified when considering the cost of each hard drive, which can be as high as seven hundred dollars, as well as the cost of the information stored on the hard drive. Graphic media presentations can be worth fifty thousand dollars. The life and reliability of the hard drive is improved by use of a superior cooling process such as the one described herein. Hard drives 42, representing all hard drives shown, are stacked so that they are sandwiched between highly conductive cooling plates 12, 14, and so forth. In this way all hard drives are maintained in a cool condition. My experiments have shown that drive tops remain close to seventy degrees Fahrenheit. Newer model hard drives have electronic components that are recessed 36 and exposed on the underside 34 of the drive. My experiments have shown that, even though these components are not directly in contact with cooling plates 21, they are sufficiently cooled to a temperature of approximately ninety degrees Fahrenheit which is well below the one hundred and twenty two degree upper specification temperature of the IC chips. To improve the transfer of cooling from the undersurface of plate 21, the plate 21 is oxidized so that the infrared portion of the spectrum is absorbed by the silver plate 21. The sandwich of plates and hard drives is placed under light compression by retaining bolts 10 and nuts 6, 8 so that the cooling transfer between plates and hard drives is maximized. Bolts 10 terminate in rubber mounting pads 30, 32. The pads 30, 32 are in turn fastened to mounting rail 28 by nuts 60. This helps protect the hard drives from the shock caused by sudden movement. FIG. 2 shows a perspective view of the cooling tank 2 and attached cooling plates 12, 14, 16, 18, 20, 21. Coolant inlet 52 tube, 4 and outlet 50 tube 3 can be clearly seen. The design is such that tubes 4, 3 can be used as either an inlet or outlet tube.

The above description and illustrations show that the present invention is a unique is compact, low noise, efficient and not prone to clogging or breakdown.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Cooling Device for Computer Hard Drive comprising:

a rectangular cooling tank;

a coolant entrance pipe;

a coolant exit pipe;

one wall of said tank being constructed of highly heat conductive metal;

a plurality of highly conductive metal cooling plates;

said plates each having a ninety degree flange;

each said flange attached to said highly conductive tank plate wall;

a plurality of hard drives sandwiched between each said cooling plate;

a plurality of compression screws that cause said cooling plates to remain in intimate contact with said hard drive housing; and a plurality of rubber shock mounts, a top surface of said shock mounts communicates with said compression screw, a bottom surface of said shock mounts attached to a mounting rail.

2. Cooling Device for Computer Hard Drive as claimed in claim 1 wherein said cooling plates have an oxidized surface that allows infrared frequencies to be absorbed by said plate.

3. Cooling Device for Computer Hard Drive as claimed in claim 1 wherein said cooling plates are made of ninety nine and nine tenths percent pure silver.

4. Cooling Device for Computer Hard Drive as claimed in claim 1 wherein said cooling plate flanges are soldered onto the silver wall of said coolant reservoir.

5. Cooling Device for Computer Hard Drive as claimed in claim 1 wherein the base and sidewalls of said coolant reservoir is made of drawn brass.

* * * * *